(12) United States Patent
Caccia et al.

(10) Patent No.: US 11,056,959 B2
(45) Date of Patent: Jul. 6, 2021

(54) LINEAR ACTUATOR

(71) Applicant: Animal Dynamics Limited, Oxford (GB)

(72) Inventors: Alex Caccia, Oxford (GB); Adrian Thomas, Oxford (GB)

(73) Assignee: Animal Dynamics Limited, Oxford (GB)

( * ) Notice: Subject to any disclaimer, the term of this patent is extended or adjusted under 35 U.S.C. 154(b) by 187 days.

(21) Appl. No.: 16/087,441

(22) PCT Filed: Mar. 22, 2017

(86) PCT No.: PCT/GB2017/050801
§ 371 (c)(1),
(2) Date: Sep. 21, 2018

(87) PCT Pub. No.: WO2017/163061
PCT Pub. Date: Sep. 28, 2017

(65) Prior Publication Data
US 2019/0131859 A1     May 2, 2019

(30) Foreign Application Priority Data
Mar. 22, 2016 (GB) ..................................... 1604793

(51) Int. Cl.
*H02K 33/02* (2006.01)
*H02K 5/20* (2006.01)
(Continued)

(52) U.S. Cl.
CPC ............. *H02K 33/02* (2013.01); *H01F 7/066* (2013.01); *H01F 7/1615* (2013.01); *H02K 5/20* (2013.01);
(Continued)

(58) Field of Classification Search
CPC .......... H02K 33/02; H02K 5/20; H02K 33/18; H02K 41/031; H02K 41/0356; H01F 7/066; H01F 7/1615; H04R 9/041
(Continued)

(56) References Cited

U.S. PATENT DOCUMENTS 1,808,149 A   6/1931   Smith
3,135,880 A   6/1964   Olson et al.
(Continued)

FOREIGN PATENT DOCUMENTS

EP   2621066 A1    7/2013
JP   2003324795 A  11/2003

OTHER PUBLICATIONS

Search Report of the United Kingdom Intellectual Property Office received in corresponding GB Application No. GB1604793.8, completed Jan. 11, 2017 (3 pages).
(Continued)

*Primary Examiner* — Bernard Rojas
(74) *Attorney, Agent, or Firm* — Alfred Y. Chu, Esq.; Brian B. Shaw, Esq.; Harter Secrest & Emery LLP

(57) ABSTRACT

A linear actuator comprising a support structure; at least one magnet provided on the support structure; a carriage; at least one coil arrangement provided around the carriage; and a spring arrangement operatively connected between the support structure and the carriage to urge the carriage towards a predetermined position relative to the support structure; wherein a part of one of the support structure and the carriage is received by a part of the other of the support (Continued)

Figure 1:
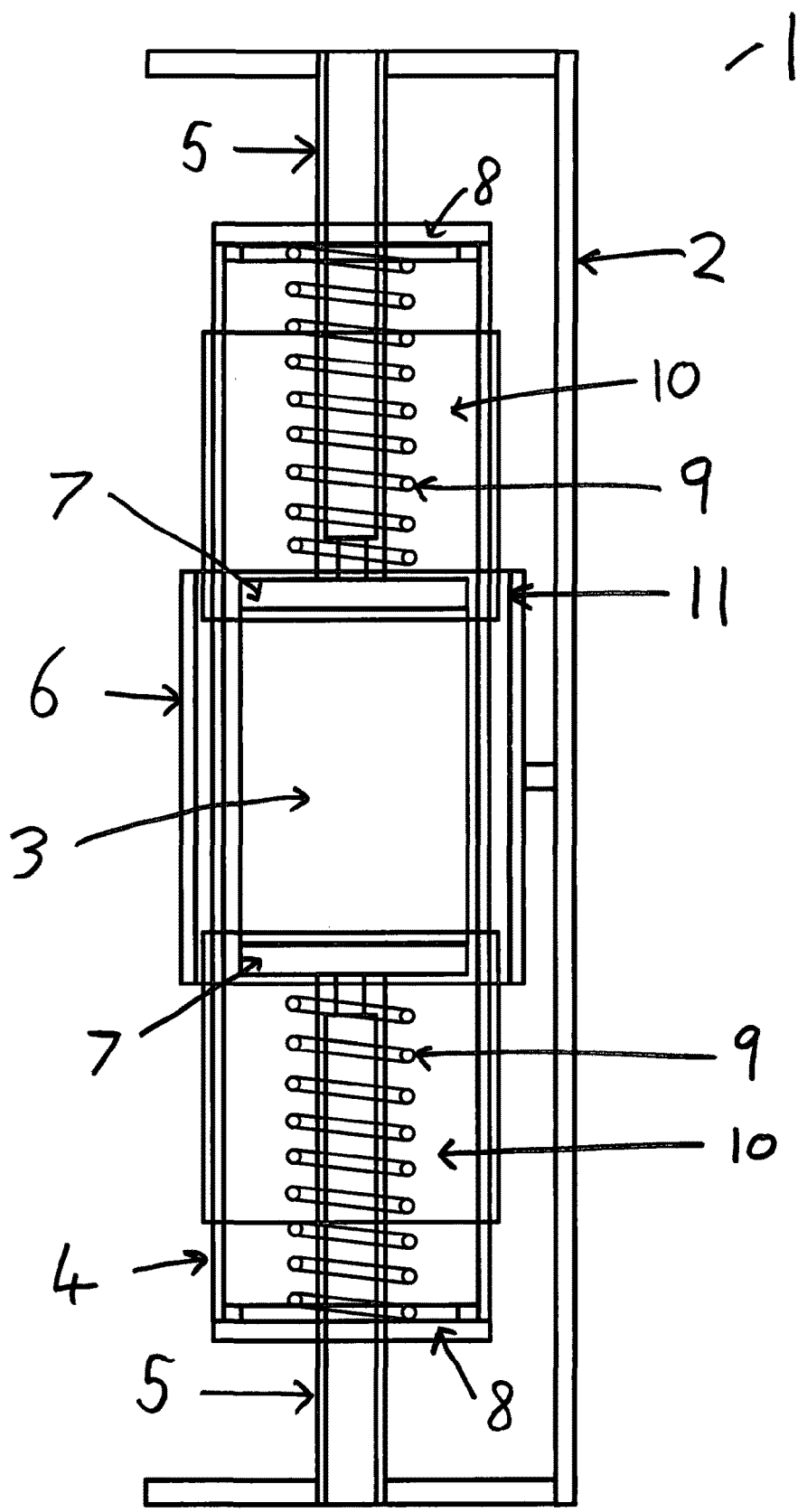

structure and carriage so as to constrain motion of the carriage relative to the support structure substantially along a longitudinal axis of the linear actuator.

13 Claims, 3 Drawing Sheets

(51) Int. Cl.
*H01F 7/16* (2006.01)
*H04R 9/04* (2006.01)
*H02K 41/035* (2006.01)
*H02K 33/18* (2006.01)
*H02K 41/03* (2006.01)
*H01F 7/06* (2006.01)
*H04R 9/02* (2006.01)
*H04R 9/06* (2006.01)

(52) U.S. Cl.
CPC ........... *H02K 33/18* (2013.01); *H02K 41/031* (2013.01); *H02K 41/0356* (2013.01); *H04R 9/041* (2013.01); *H01F 2007/163* (2013.01); *H01F 2007/1692* (2013.01); *H02K 2205/09* (2013.01); *H04R 9/022* (2013.01); *H04R 9/043* (2013.01); *H04R 9/063* (2013.01)

(58) Field of Classification Search
USPC .............................. 335/220–229; 310/15–39
See application file for complete search history.

(56) References Cited

U.S. PATENT DOCUMENTS

| | | | |
|---|---|---|---|
| 3,760,206 A | | 9/1973 | Hertrich |
| 4,327,257 A | | 4/1982 | Schwartz |
| 4,896,127 A | * | 1/1990 | Hida ..................... H01H 50/88 335/239 |
| 5,231,336 A | * | 7/1993 | van Namen ........... F16F 7/1011 318/128 |
| 5,434,549 A | * | 7/1995 | Hirabayashi ........... H02K 33/00 335/229 |
| 5,896,076 A | * | 4/1999 | van Namen .......... H01F 7/1615 335/222 |
| 2005/0008165 A1 | | 1/2005 | Sack et al. |
| 2011/0278778 A1 | | 11/2011 | Qattan |

OTHER PUBLICATIONS

International Search Report and Written Opinion of the International Searching Authority received in corresponding International Application No. PCT/GB2017/050801, completed Jul. 12, 2017 (10 pages).

* cited by examiner

LINEAR ACTUATOR

BACKGROUND

The present invention relates to a linear actuator.

Linear actuators are used to create linear motion, and are utilized in a variety of areas including transportation, speakers and printers.

Linear actuators within loudspeakers require the actuator to return to a predetermined position in order to operate. The cone of the loudspeaker provides both the restoring force and the centring component in a single part. However, this design has the disadvantage of being unable to resist rocking. Rocking is a situation where the natural vibration patterns of the loudspeaker produce undesired rotational vibrations. The lateral forces introduced by the rocking cause the coil to rub on the magnet assembly, which leads to power loss and prevents the motor from operating at resonance.

DESCRIPTION OF INVENTION

The present invention provides a linear actuator comprising: a support structure, at least one magnet provided on the support structure, a carriage, at least one coil arrangement provided around the carriage and a spring arrangement operatively connected between the support structure and the carriage to urge the carriage towards a predetermined position relative to the support structure, wherein a part of one of the support structure and the carriage is received by a part of the other of the support structure and carriage so as to constrain motion of the carriage relative to the support structure substantially along a longitudinal axis of the linear actuator.

Preferably, the support structure comprises at least one rod.

Preferably, the support structure comprises two rods that are respectively secured to opposing faces of the magnet and extend in opposing directions away from the magnet.

Preferably, there is at least one mounting plate between the rod(s) and the magnet.

Preferably, the at least one mounting plate is iron.

Preferably, the support structure further comprises a tube around the carriage.

Preferably, there is an air gap between the tube and the carriage.

Preferably, the air gap is substantially 0.3 mm to 0.5 mm.

Preferably, the carriage is substantially cylindrical.

Preferably, the carriage has at least one plate with an aperture to receive the support structure.

Preferably, the at least one plate further comprises ventilation holes.

Preferably, the magnet is received within the carriage.

Preferably, there is an air gap between the at least one magnet and the carriage.

Preferably, the air gap between the at least one magnet and the carriage is as small as possible to allow clearance between the moving carriage and the coils.

Preferably, the magnet is disposed between the at least one coil arrangement.

Preferably, the at least one coil arrangement comprises at least one coil.

Preferably, the at least one coil arrangement comprises two coils.

Preferably, the at least one coil arrangement comprises two coil arrangements provided adjacent opposite ends of the carriage.

Preferably, the distance between the two coil arrangements is substantially equal to a longitudinal length of the magnet.

Preferably, at least a part of the spring arrangement is received within the carriage.

Preferably, at least a part of the spring arrangement is provided on the outside of the carriage.

Preferably, at least a part of the spring arrangement is provided on opposing sides of the magnet.

Preferably, the spring arrangement comprises two springs that are provided on opposing sides of the magnet.

Preferably, at least one spring is a helical spring.

Preferably, at least one spring is a wave spring.

Preferably, at least one spring is of any spring design or material, including but not limited to a coil spring, an elastomeric spring and a gas spring.

Preferably, the at least one coil arrangement is provided with electrical current through the spring arrangement.

Preferably, there are two magnets.

Preferably, the linear actuator comprises a control system to control operation of the linear actuator.

Preferably, the linear actuator comprises: a rod arrangement, at least one magnet provided on the rod arrangement, a housing, at least one coil arrangement provided around the housing and a spring arrangement operatively connected between the rod arrangement and the housing to urge the rod arrangement towards a predetermined position relative to the housing, wherein a part of one of the rod arrangement and the housing is received by a part of the other of the housing and the rod arrangement so as to constrain motion of the rod arrangement relative to the housing substantially along a longitudinal axis of the linear actuator.

Preferably, the linear actuator comprises: a housing, at least one magnet disposed within the housing, at least one coil arrangement provided around the housing and a spring arrangement operatively connected between the at least one magnet and the housing to urge the at least one magnet towards a predetermined position relative to the housing, wherein, in use, one of the housing and the at least one magnet moves relative to the other of the at least one magnet and the housing.

Embodiments of the present invention will now be described, by way of example only, with reference to the accompanying figures in which:

FIG. 1 schematically illustrates a linear actuator embodying the present invention.

Figure 2:
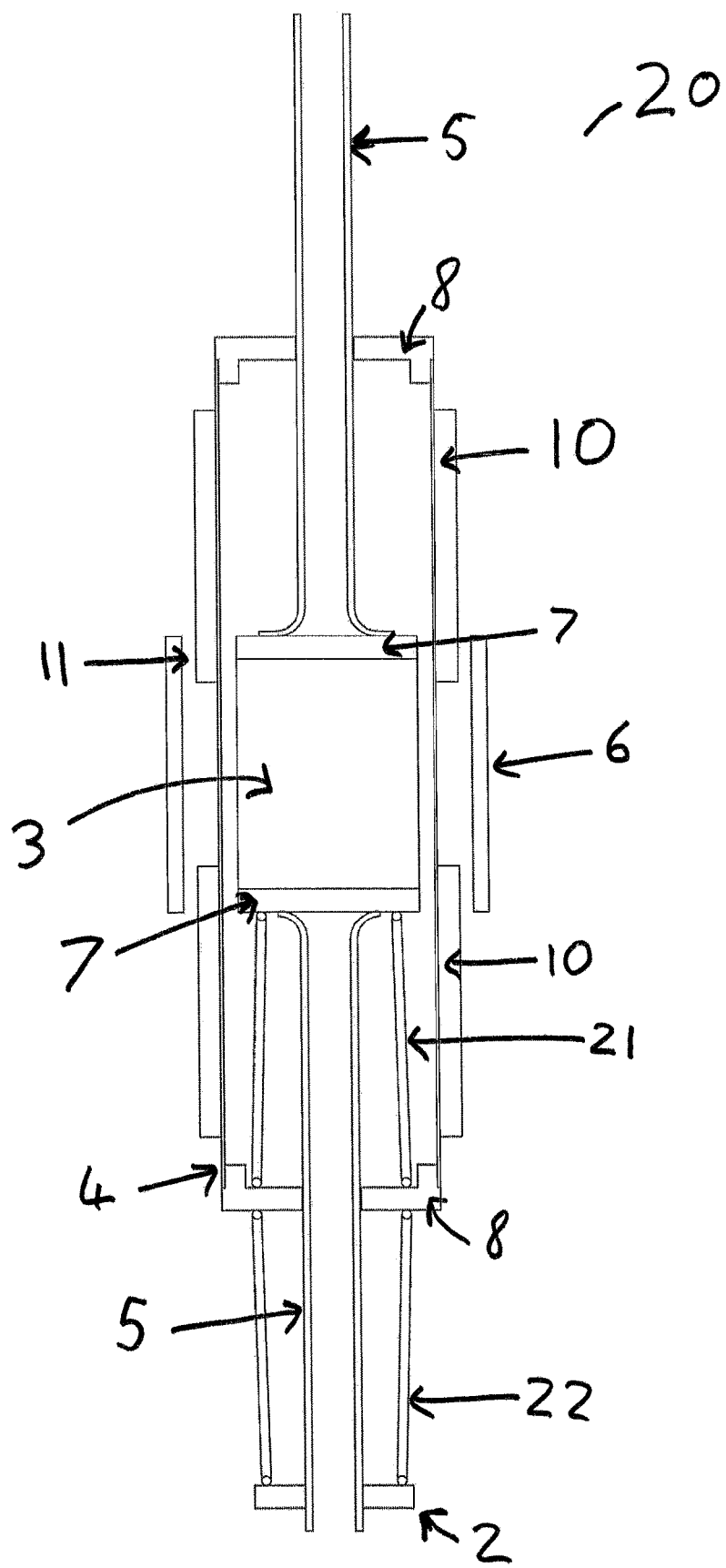

FIG. 2 schematically illustrates an alternative embodiment of the present invention. Equivalent features are numbered the same as in FIG. 1.

Figure 3:
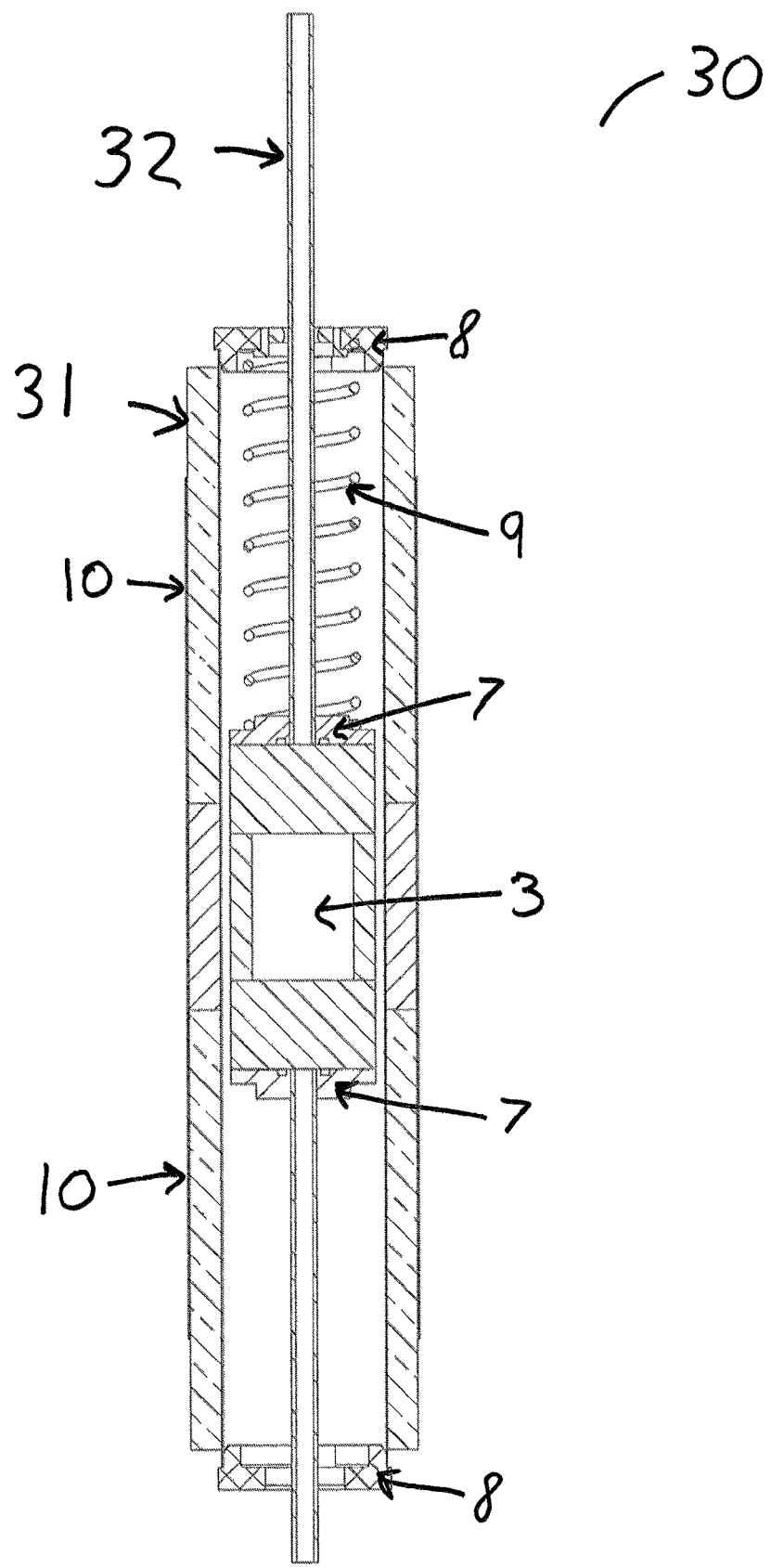

FIG. 3 schematically illustrates an alternative embodiment of the present invention. Equivalent features are numbered the same as in FIG. 1.

FIG. 1 shows a linear actuator 1 embodying the present invention, comprising a support structure 2, a magnet 3 and a cylindrical carriage 4. The support structure comprises two rods 5 that are secured to opposing faces of the magnet 3, and a tube 6 around the carriage 4. Between the rods 5 and the magnet 3 there are iron mounting plates 7.

Alternatively, the support structure 2 can comprise a single rod or more than two rods. For example, a single rod could pass through the magnet 3, and take the place of the two rods 5 previously described. Also, the rod(s) can attach directly to the magnet without the use of a mounting plate or a single mounting plate can be used. Furthermore, the mounting plates are preferably made of iron, although they could also comprise any other magnetic material.

At either end of the carriage 4 are plates 8 that have apertures to slidably receive the rods 5. The plates 8 restrict the motion of the carriage 4 to be substantially along the longitudinal axis of the rods 5. Advantageously, this reduces or substantially limits rocking and the associated lateral forces within the linear actuator 1, preventing the coil from impacting against the magnet. This in turn limits power loss and allows the linear actuator 1 to operate at resonance.

To reduce frictional forces between the plates 8 and the rods 5, the plates 8 and/or the rods 5 can be coated in a material that reduces friction, such as PTFE. Alternatively, a grommet made of a material that reduces friction, such as PTFE, could be used. The grommet can be placed into the apertures of the plates 8, and the rods 5 could then easily slide through the grommets.

Preferably, the plates 8 further comprise ventilation holes to allow the passage of air. This reduces air resistance and allows air to escape that would otherwise be compressed and impede the motion of the carriage.

The linear actuator 1 further comprises a spring arrangement comprising two helical springs 9 that are disposed between the respective ends of the carriage 4 and the respective iron mounting plates 7. The springs 8 generate a restoring force such that, in use, the carriage 4 is urged towards a predetermined position relative to the support structure 2. Preferably the predetermined position is at the centre of mass of the system. This keeps the linear actuator 1 symmetrical and increases stability.

The linear actuator 1 further comprises a coil arrangement comprising two coils 10 provided around the carriage 4, one at each opposing end of the carriage 4. In use, a current is applied to at least one of the coils 10, which in combination with the magnetic field created by the magnet 3, causes the carriage 4 to move relative to the magnet 3 and thus the support structure 2. The springs 9 provide a restoring force to urge the carriage 4 back to a predetermined position. The magnitude of the restoring force is proportional to the distance that the carriage 4 is away from the predetermined position.

The linear motion generated by linear actuator 1 is taken from the motion of the carriage 4 relative to the support structure. In one embodiment the support structure 2 is fixed relative to the ground, and motion is taken from plates 8 moving relative to the support structure. Alternatively, the carriage 4 could be fixed relative to the ground and the motion could be taken from the support structure 2 moving relative to the carriage 4. FIG. 3 illustrates an embodiment of the present invention which adopts the principle of this alternative.

A gap 11 is provided between the tube 6 and the carriage 4 to allow for the coils 10 to move in and out of the tube 6 without interference. Preferably, the gap is around 0.3 mm to 0.5 mm.

Although there is an air gap between the tube 6 and the coils 10, the carriage 4 on which the coils 10 are disposed is constrained to move substantially along the longitudinal axis of the rods 5. As this leads to the possibility of some lateral motion, the coils 10, tube 6 and/or carriage 4 can be coated in a material that reduces friction, such as PTFE. Even if the tube 6 was to rub against the carriage 4 and/or the coils 10, this coating would prevent friction forces from affecting the performance.

The mounting plates 7 and the tube 6 around the carriage 4 focus the magnetic flux such that the magnetic field lines are perpendicular to the coils. The carriage 4 in FIG. 1 is shown to be cylindrical, although other shapes are possible to achieve the same result. The tube 6 is preferably made from a soft magnetic material.

Using two coils 10 has the advantage of increasing the linearity of the linear actuator 1, allowing for greater displacement of the carriage 4 while also improving the heat capacity of the linear actuator 1.

Preferably, the distance between the two coils 10 is substantially equal to the longitudinal length of the magnet 3.

In an alternative embodiment, there are two coils disposed at each opposing end of the carriage 4. This allows for even greater linearity, leading to greater displacement. Further embodiments are possible with more than two coils disposed at each end of the carriage 4.

FIG. 1 shows an embodiment wherein the spring arrangement comprises two helical springs 9 inside the carriage 4. In alternative embodiments, the spring arrangement is outside of the carriage 4, or at least part of the spring arrangement is inside of the carriage 4 and at least part of the spring arrangement is be outside of the carriage 4.

FIG. 2 shows an alternative linear actuator 20 embodying the present invention whereby the spring arrangement comprises a first spring 21 disposed within the carriage 4, and second spring 22 outside of the carriage 4. Any arrangement of springs can be used as long as the carriage 4 is urged back to a predetermined position.

FIG. 3 shows an alternative linear actuator 30 embodying the present invention comprising a housing 31 and a rod arrangement 32 that, in use, move relative to each other. A spring arrangement 9 is connected between the rod arrangement 32 and the housing 31 to urge the rod arrangement 32 towards a predetermined position relative to the housing 31.

In one embodiment, an electrical connection can be made between the coils 10 and support structure 2 through the second spring 22, to supply current to the coils 10. Alternatively, an electrical connection can be made between the coils 10 and the rod 5 through the first spring 21. This eliminates the need for a separate electrical connection to the coils 10 via flexible wires.

Embodiments of a linear actuator 1 have been described above with the use of a single magnet 3. Embodiments could also include two or more magnets.

Although the magnets have been shown to be within the carriage 4, it is also possible for them to be outside of the carriage.

Although the embodiments above have been described with the spring arrangement comprising helical springs, any other form of resilient or elastic mounting could be used so long as after displacement, the carriage 4 is urged back to a predetermined position.

The embodiments above make use of plates 8 to restrict the motion of the carriage 4 to be substantially along the longitudinal axis of the rods 5. It is also possible to use a single plate. Alternatively, if the diameter of the rods 5 is close to the diameter of the carriage 4, it is possible to restrict the motion of the carriage 4 to be substantially along the longitudinal axis of the rods 5, without the need for the plates 8. In this case it is also possible that the carriage 4 and/or the rods 5 are coated in a material to limit friction, such as PTFE.

In a further embodiment, a control system is provided to control operation of the linear actuator 1.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A linear actuator comprising
a stationary support structure;
at least one magnet provided on the support structure, wherein the support structure comprises two rods that are respectively secured to opposing faces of the magnet and extend in opposing directions away from the magnet;
a carriage;
at least one coil arrangement provided around the carriage; and
a spring arrangement operatively connected between the support structure and the carriage to urge the carriage towards a predetermined position relative to the support structure;
wherein a part of the support structure is received by a part of the carriage so as to constrain motion of the carriage relative to the support structure substantially along a longitudinal axis of the linear actuator; and
wherein the support structure further comprises a tube around the carriage, wherein the motion of the carriage comprises the output of the linear actuator.

2. The linear actuator of claim 1, wherein there is at least one mounting plate between at least one of the first rod and the second rod and the magnet.

3. The linear actuator of claim 2, wherein the at least one mounting plate is iron.

4. The linear actuator of claim 1, wherein there is an air gap between the tube and the carriage.

5. The linear actuator of claim 4, wherein the air gap is substantially 0.3 mm to 0.5 mm.

6. The linear actuator of claim 1, wherein the carriage is substantially cylindrical and/or has at least one plate with an aperture to receive the support structure.

7. The linear actuator of claim 1, wherein the magnet is received within the carriage and/or is disposed between the at least one coil arrangement.

8. The linear actuator of claim 1, wherein the at least one coil arrangement comprises at least one coil.

9. The linear actuator of claim 1, wherein the at least one coil arrangement comprises two coil arrangements provided adjacent opposite ends of the carriage.

10. The linear actuator of claim 9, wherein the distance between the two coil arrangements is substantially equal to a longitudinal length of the magnet.

11. The linear actuator of claim 1, wherein at least a part of the spring arrangement is received within the carriage and/or is provided on the outside of the carriage and/or is provided on opposing sides of the magnet.

12. The linear actuator of claim 1, wherein the spring arrangement comprises two springs that are provided on opposing sides of the magnet.

13. The linear actuator of claim 1, wherein there are two magnets.

* * * * *